(12) United States Patent
Grattan (10) Patent No.: US 10,150,507 B2
(45) Date of Patent: Dec. 11, 2018

(54) VEHICLE BODY STRUCTURE

(71) Applicant: Nissan North America, Inc., Franklin, TN (US)

(72) Inventor: Patrick Grattan, Wixom, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 15/404,383

(22) Filed: Jan. 12, 2017

(65) Prior Publication Data

US 2018/0194402 A1 Jul. 12, 2018

(51) Int. Cl.
| | |
|---|---|
| *B62D 21/15* | (2006.01) |
| *B62D 21/02* | (2006.01) |
| *B62D 27/06* | (2006.01) |
| *B62D 27/02* | (2006.01) |
| *B62D 21/05* | (2006.01) |
| *B62D 25/08* | (2006.01) |

(52) U.S. Cl.
CPC ............ *B62D 21/152* (2013.01); *B62D 21/02* (2013.01); *B62D 21/05* (2013.01); *B62D 25/082* (2013.01); *B62D 27/023* (2013.01); *B62D 27/06* (2013.01)

(58) Field of Classification Search
CPC ...... B62D 21/152; B62D 21/02; B62D 21/05; B62D 25/082; B62D 27/023; B62D 27/06
USPC ...................................................... 296/187.1
See application file for complete search history.

(56) References Cited

U.S. PATENT DOCUMENTS

| | | |
|---|---|---|
| 7,819,218 B2 | 10/2010 | Eichberger et al. |
| 8,398,153 B1 | 3/2013 | Dandekar et al. |
| 8,764,096 B2 | 7/2014 | Han et al. |
| 8,985,258 B1 | 3/2015 | Midoun et al. |
| 8,985,671 B1 | 3/2015 | Lei et al. |
| 9,056,634 B2 | 6/2015 | Watanabe |
| 9,067,549 B2 | 6/2015 | Baccouche et al. |
| 9,079,619 B2 | 7/2015 | Gupta et al. |
| 9,193,318 B2 | 11/2015 | Barbat et al. |
| 9,233,716 B2 | 1/2016 | Midoun et al. |
| 9,266,485 B2 | 2/2016 | Kuriyama et al. |
| 9,272,678 B2 | 3/2016 | Nam et al. |
| 9,415,805 B2 | 8/2016 | Fujikawa et al. |

(Continued)

FOREIGN PATENT DOCUMENTS

DE    102013003911 A1    9/2014

*Primary Examiner* — D Glenn Dayoan
*Assistant Examiner* — Dana D Ivey
(74) *Attorney, Agent, or Firm* — Global IP Counselors, LLP (57) ABSTRACT

A body vehicle structure has a front side member, a power plant and an elongated member. The front side member has an outboard opening and an inboard opening open to a hollow interior. The outboard opening and the inboard opening are offset from one another relative to a front end of the front side member. The power plant is supported to the vehicle structure inboard of the front side member adjacent to the inboard opening. The elongated member extends through the outboard opening, the hollow interior, and the inboard opening of the front side member. In response to an impact event of an off-center impact test a front end of the elongated member adjacent and outboard relative to a front end of the front side member is impacted moving a rear end of the elongated member into contact with the vehicle power plant transmitting impacting force thereto.

17 Claims, 8 Drawing Sheets

(56) References Cited

U.S. PATENT DOCUMENTS

| | | |
|---|---|---|
| 2008/0023954 A1 | 1/2008 | Eichberger et al. |
| 2009/0302591 A1* | 12/2009 | Auer ..................... B60R 19/54 280/784 |
| 2015/0021935 A1 | 1/2015 | Baccouche et al. |
| 2015/0298742 A1 | 10/2015 | Ono et al. |
| 2015/0336525 A1* | 11/2015 | Nam ..................... B60R 19/04 296/187.1 |
| 2015/0360633 A1 | 12/2015 | Nishida et al. |

* cited by examiner

VEHICLE BODY STRUCTURE

BACKGROUND

Field of the Invention

The present invention generally relates to a vehicle structure. More specifically, the present invention relates to an off-center support structure attached to portions of a vehicle frame that responds to and absorbs impact force during an off-center impact test.

Background Information

Figure 1:
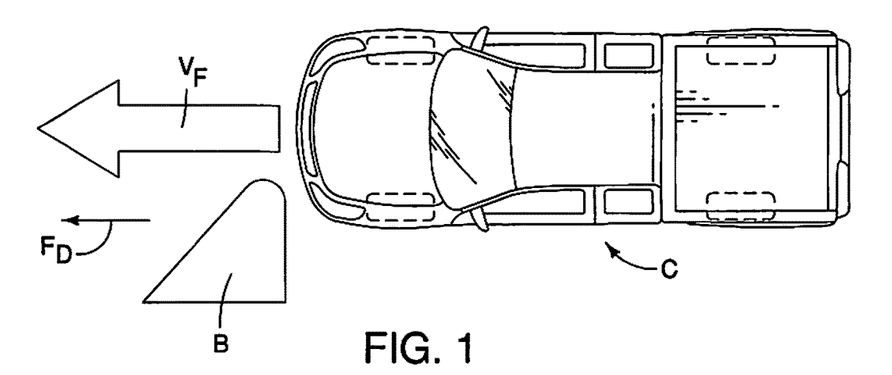
FIG. 1 is a schematic view of a conventional moving vehicle showing its response to a small overlap test where a front corner of the vehicle is aligned with a fixed, rigid barrier for eventual impact with the barrier.
Figure 2:
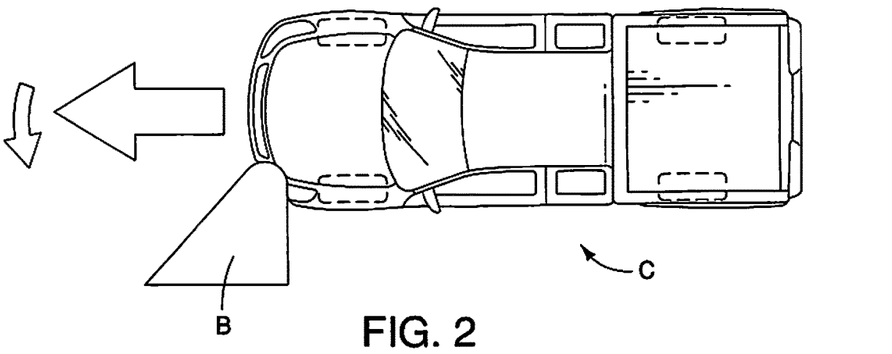
FIG. 2 is another schematic view of the conventional vehicle showing its response to the small overlap test at the beginning of an impact event with the front corner of the conventional vehicle impacting the barrier and beginning to undergo deformation.
Figure 3:
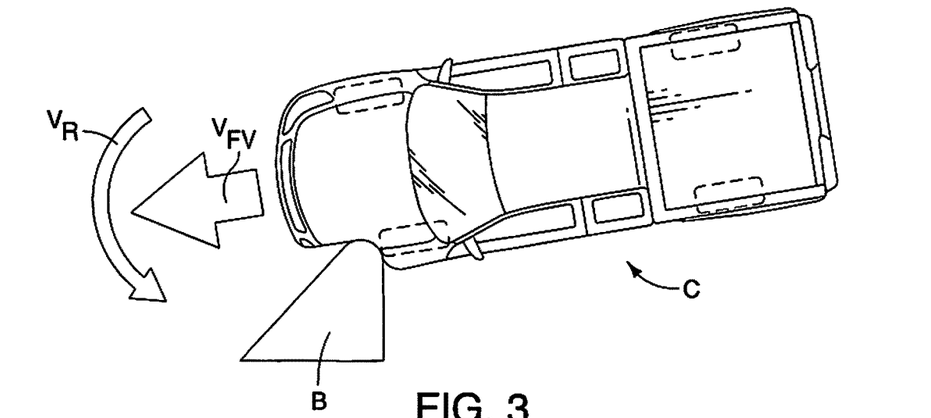
FIG. 3 is still another schematic view of the conventional vehicle showing its response to the small overlap test with the conventional vehicle undergoing further deformation during the impact event.

Vehicle structures are routinely being redesigned to include structural features that absorb impact forces in response to impact events. Recently introduced impact event tests include an off-center impact test (also referred to as a small overlap test) where a vehicle is provided with velocity in a vehicle longitudinal direction (forward momentum) such that a front corner of the vehicle (approximately 25 percent of the overall width of the vehicle) impacts a fixed, rigid barrier. FIGS. 1, 2 and 3 schematically show an example of a conventional vehicle C undergoing an impact event with a fixed barrier B in accordance with the off-center impact test.

FIG. 1 shows the conventional vehicle C approaching the rigid barrier B in the off-center impact test. FIG. 2 shows the conventional vehicle C just after initial impact with the rigid barrier B showing initial deformation and forward momentum being transformed into rotational displacement about the rigid barrier B. FIG. 3 shows the conventional vehicle C undergoing further deformation and rotation as a result of the impact event.

SUMMARY

One object of the disclosure is to provide a vehicle frame with additional structural elements that absorb and redirect impact energy during an off-center impact test.

In view of the state of the known technology, one aspect of the present disclosure is to provide a vehicle body structure with a vehicle structure, a vehicle power plant and an off-center impact structure. The vehicle structure has a front side member with a front end and a front-section extending rearward from the front end. The front side member defines a hollow interior and extends in a vehicle longitudinal direction. The front side member has an outboard wall and an inboard wall. The outboard wall has an outboard opening extending through the outboard wall and to the hollow interior. The inboard wall has an inboard opening extending through the inboard wall and to the hollow interior. The outboard opening is located a first distance from the front end of the front side member and the inboard opening is located a second distance from the front end of the front side member. The second distance is greater than the first distance. The vehicle power plant is supported to the vehicle structure inboard of the front side member adjacent to the inboard opening. The off-center impact structure has an elongated member that extends through the outboard opening, through the hollow interior and through the inboard opening of the front side member. The elongated member is fixedly coupled to the outboard wall and the inboard wall. A front end of the elongated member is located adjacent and outboard of the front end of the front side member and a rear end of the elongated member is located adjacent to the vehicle power plant. In response to an impact event of an off-center impact test, the rear end of the elongated member contacts the vehicle power plant transmitting impacting force thereto.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Referring initially to FIG. 4-10, a vehicle 10 is illustrated in accordance with a first embodiment. The vehicle 10 is provided with an off-center impact structure 12 (shown in FIGS. 8-12) that is configured to absorb and re-direct forces during an impact event such as an off-center impact test (also referred to as a small overlap test) described further below.

The Insurance Institute for Highway Safety (IIHS) has developed various tests where vehicles are provided with forward velocity and impacted against fixed, rigid barriers, like the rigid barrier B depicted in FIGS. 1-3. In the IIHS offset tests, the conventional vehicle C is aimed at the rigid barrier B such that approximately 25 percent of the front area of the conventional vehicle C impacts the rigid barrier B. In other words, as indicated in FIGS. 1-3, only a front corner of the conventional vehicle C impacts the rigid barrier B. This IIHS test is also known as a frontal offset, narrow offset, or small overlap test. In such tests, a front bumper assembly of the conventional vehicle C is either not impacted, or undergoes only limited contact with the rigid barrier B during the impact event. Therefore, other structures at the front of the conventional vehicle C impact the rigid barrier B and absorb at least some of the kinetic energy associated with the rapid deceleration of the vehicle C that results from the impact event. When the vehicle C is provided with velocity and impacts the rigid barrier B, the rapid deceleration of the vehicle C transforms the kinetic energy associated with the mass and velocity of the vehicle C into deformation of the vehicle C and counter movement of the vehicle C. As is well known, kinetic energy is a function of mass times velocity. During the small offset test, the kinetic energy of the vehicle C is partially absorbed and partially transformed into other forms of kinetic energy, such as rotary motion. It should be understood that the kinetic energy associated with the forward velocity of the vehicle C (and in the description below) is transformed into an impacting force upon impact due to the rapid deceleration of the vehicle C. Consequently, hereinbelow, the terms impact force and impacting force as used herein correspond to the kinetic energy applied to the vehicle 10 during the small overlap test (the impact event), as described below with respect to the various embodiments.

The test developed by the IIHS is represented schematically in FIGS. 1-3. During the impact event, a variety of structures undergo deformation. This deformation is not explicitly depicted in FIGS. 2 and 3 with any degree of accuracy because such deformation varies from conventional vehicle to conventional vehicle, depending upon the overall design of the front structure of the conventional vehicle C. Instead, in FIG. 3, the conventional vehicle C is depicted with a generic degree of deformation as a result of the impact event. However, the conventional vehicles tested by the IIHS using the small overlap test have a relatively consistent response in that during the impact event with the rigid barrier B, the rear end R of the conventional vehicle C undergoes some rotation and swings laterally away from the rigid barrier B, as indicated in FIG. 3.

In other words, the forward velocity $F_F$ of the conventional vehicle C as it moves is transformed upon impact with the rigid barrier B. The velocity $F_F$ results in an equal and opposite reaction force acting on the vehicle C as the vehicle C suddenly decelerates. It is desirable to move the vehicle laterally outward from the barrier and avoid unnecessary loading of the dash-wall and/or A-pillar.

Figure 4:
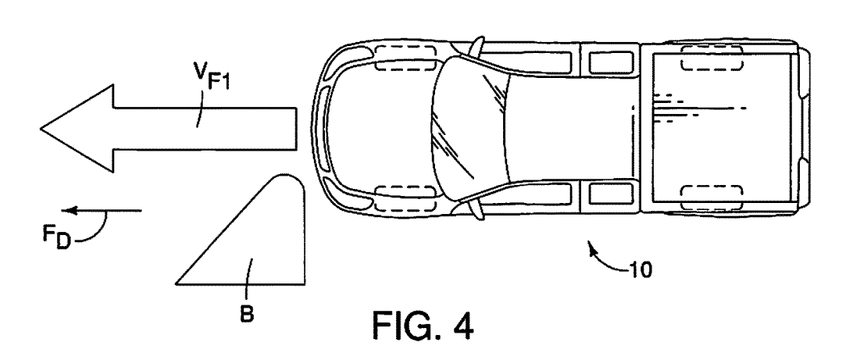
FIG. 4 is a schematic view of a moving vehicle being subjected to a small overlap test where approximately 25 percent of the front of the vehicle aligned with a fixed, rigid barrier for eventual impact with the barrier in accordance with a first embodiment.
Figure 5:
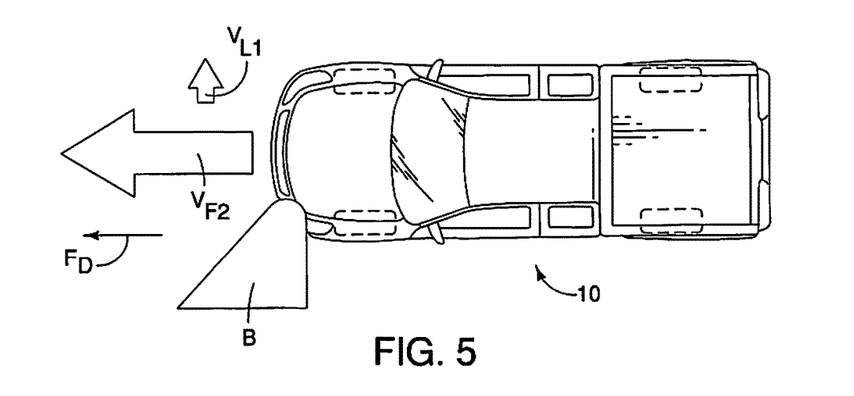
FIG. 5 is another schematic view of the vehicle depicted in FIG. 4 showing an initial response to the impact event of the small overlap test with a front corner of the vehicle impacting the barrier and beginning to undergo deformation in accordance with the first embodiment.
Figure 6:
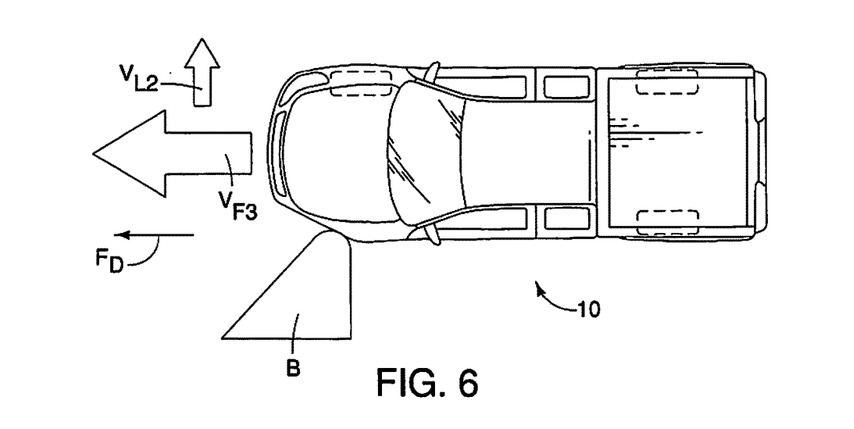
FIG. 6 is still another schematic view of the vehicle depicted in FIGS. 4 and 5 showing a subsequent response to the impact event of the small overlap test with the moving vehicle undergoing further deformation during the impact event in accordance with the first embodiment.

The force directing features of the off-center impact structure 12 of the vehicle 10 as described hereinbelow are such that during an impact event (such as a small overlap test), the impact forces are absorbed and transmitted to various structures within the vehicle 10, as shown in FIGS. 4, 5 and 6. Specifically, in FIG. 4 the vehicle 10 is provided with a forward velocity $V_{F1}$ and is subjected to a small overlap test where approximately 25 percent of the front of the vehicle is aligned with the rigid barrier B. In FIG. 5 the vehicle 10 undergoes an initial response to the impact event of the small overlap test with a front corner of the vehicle impacting the barrier and beginning to undergo deformation. Hence, the forward velocity $V_{F1}$ is reduced to a velocity $V_{F2}$ with some of the impact energy causing the vehicle 10 to move laterally with a velocity $V_{L1}$, as shown in FIG. 5. In FIG. 6, the vehicle 10 undergoes a subsequent response to the impact event in that one or more of the features of the off-center impact structure 12 has functioned properly and caused the vehicle 10 to move laterally with the forward velocity $V_{F2}$ is reduced to a velocity $V_{F3}$ and a lateral velocity VII that is greater than the $V_{L1}$. In other words, the off-center impact structure 12 is configured to absorb impact energy and direct that force to various portions of the vehicle, and the off-center impact structure 12 is also configured to move the vehicle 10 in a lateral direction away from the barrier B.

It should be understood from the drawings and the description herein, that during an impact event, such as the small overlap test, the reaction forces experienced by the vehicle 10 as it impacts the rigid barrier B are significant. These significant reaction forces are exponentially greater than the forces the structures of the vehicle 10 undergo during normal operating usage of the vehicle 10. In other words, the impact events referred to herein are intended as destructive tests. Further, the impact events of the small overlap tests are configured such that the vehicle 10 impacts the rigid barrier B at portions of the vehicle 10 outboard of some of the vehicle's structures (not a central area of the vehicle 10), as described in greater detail below.

In the various embodiments described below, the vehicle 10 includes combinations of features of the off-center impact structure 12 shown in FIGS. 9 and 10, and described further below.

Figure 7:
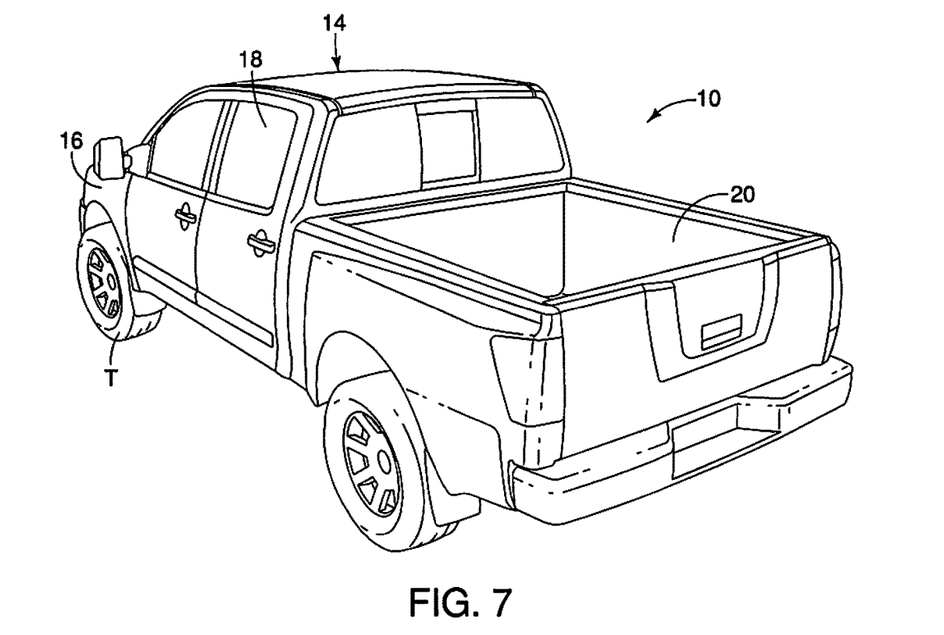
FIG. 7 is a perspective view of the vehicle having an off-center impact structure in accordance with the first embodiment.

FIG. 7 shows one embodiment of the vehicle 10. In FIG. 7, the vehicle 10 is depicted as a pickup truck that includes a body structure 14 that defines, for example, an engine compartment 16, a passenger compartment 18 and a cargo area 20. The body structure 14 is installed to and rests on a frame 22. The frame 22 is shown removed from the vehicle 10 in FIGS. 8 and 9. Specifically, FIG. 8 shows the frame 22 with the off-center impact structure 12 installed thereto, and FIG. 9 shows only a front area of the frame 22 with the off-center impact structure 12 installed thereto.

In FIG. 7, the depicted pickup truck that defines the vehicle 10 is a heavy-duty vehicle intended to haul large and/or heavy materials. The frame 22 is therefore a rigid, strong structure able to withstand heavy duty usage. However, it should be understood from the drawings and the description herein, that the frame 22 and the off-center impact structure 12 described below can be configured for smaller vehicles or larger vehicles and is not limited to usage in a heavy-duty vehicle such as the vehicle 10. In other words, the off-center impact structure 12 can be used on any size vehicle that includes a frame such as the frame 22 where the body structure 14 attaches to and is supported by the frame 22. It should also be understood from the drawings and description, that the off-center impact structure 12 can also be employed with a unibody vehicle. A unibody vehicle is a vehicle that does not typically includes a separate frame such as the frame 22. Rather, the unibody vehicle includes various structural elements welded together. Elements of the unibody vehicle serve as frame elements functionally equivalent to the elements of the frame 22. For example, U.S. Pat. No. 8,870,267 assigned to Nissan North America, discloses a unibody vehicle body structure. The front structural support portions (30) disclosed in U.S. Pat. No. 8,870,267 are basically vehicle side members, such as those of the frame 22 (described in greater detail below). U.S. Pat. No. 9,180,913, also assigned to Nissan North America, also discloses a unibody vehicle body structure and further discloses an engine cradle. The elements of the off-center impact structure 12 can be installed to portions of the unibody vehicle disclosed in U.S. Pat. No. 8,870,267 and portions of the engine cradle of U.S. Pat. No. 8,870,267. Both U.S. Pat. No. 8,870,267 and U.S. Pat. No. 9,180,913 are incorporated herein by reference in their entirety. Since unibody vehicles are conventional structures, further description is omitted for the sake of brevity.

Figure 8:
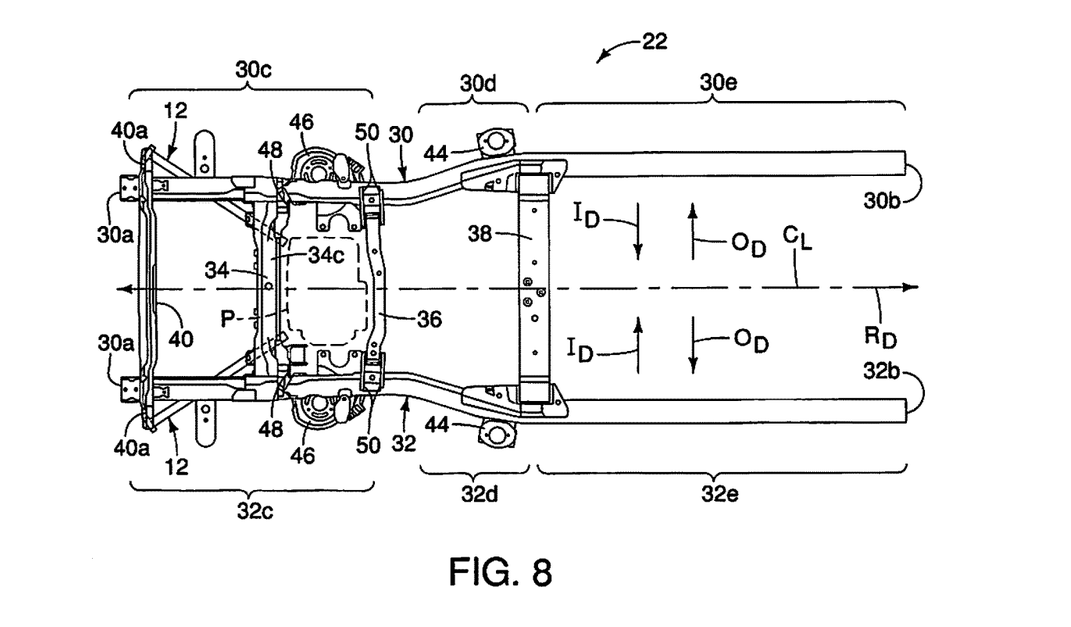
FIG. 8 is a bottom view (looking upward) of a frame from the vehicle depicted in FIG. 7, showing two sets of the off-center impact structures attached to respective a front side members at either side of the frame in accordance with the first embodiment.
Figure 9:
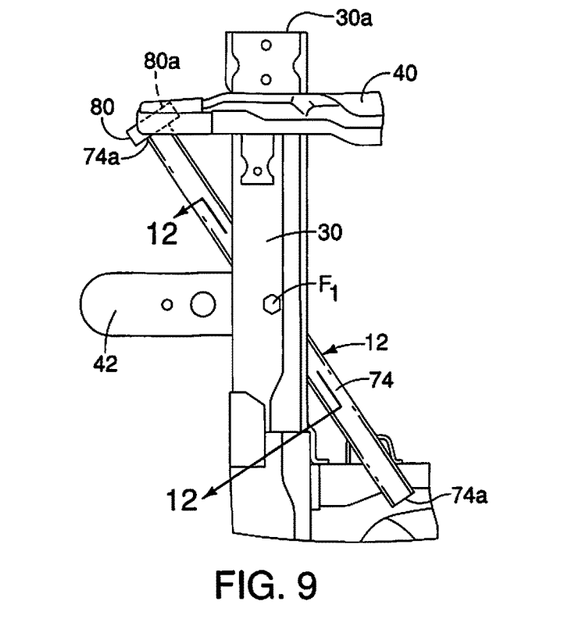
FIG. 9 is a top view (looking downward) of a driver's side portion of the frame depicted in FIG. 8, with the off-center impact structure installed to the frame structure in accordance with the first embodiment.
Figure 10:
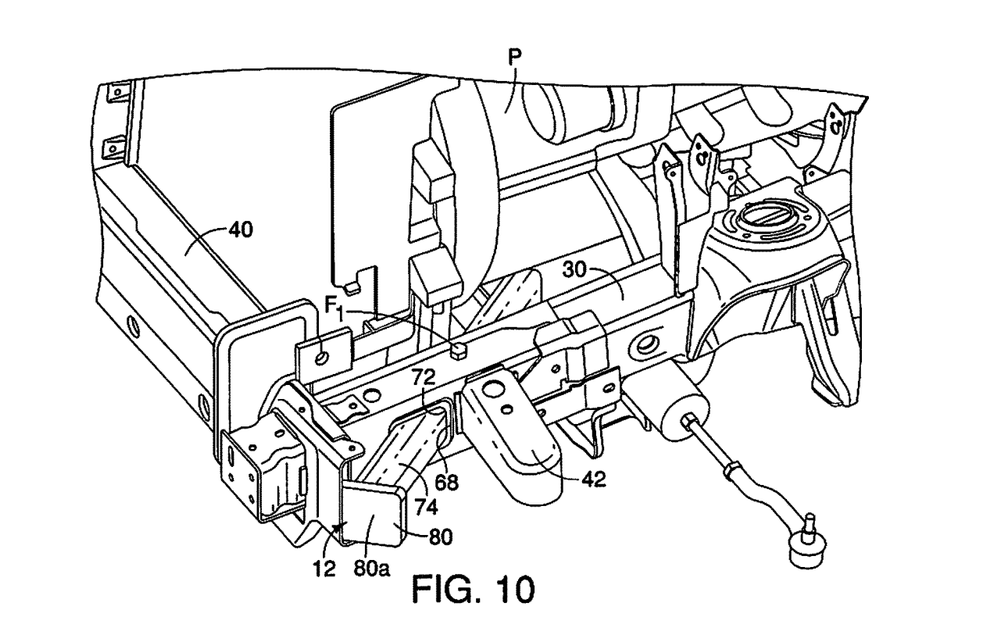
FIG. 10 is a perspective view of the driver's front side of the frame and the off-center impact structure, showing details of the off-center impact structure in accordance with the first embodiment.

The off-center impact structure 12 is shown in FIGS. 8 and 9 installed to specific portions of the frame 22.

In FIG. 8 several directions relative to the frame 22 (and the vehicle 10) are shown in order to define orientations of the various features of the vehicle 10 and the off-center impact structure 12. Specifically, the vehicle 10 and the frame 22 define a longitudinal center line $C_L$ that extends in a lengthwise direction of the vehicle 10 along a central portion of the vehicle 10. At a left-hand side of FIG. 8, a forward direction $F_D$ is indicated by the depicted arrow, and at a right-hand side of FIG. 8 a rearward direction $R_D$ is indicated by the depicted arrow. As well, inboard directions $I_D$ and outboard directions $O_D$ relative to the longitudinal center line $C_L$ are also shown in FIG. 8.

As shown in FIG. 8, the frame 22 includes a front side member 30, a second side member 32, a first cross-member 34, a second cross-member 36 and a third cross-member 38 and a front cross-member 40. FIG. 8 shows an underside of the frame 22. In other words, the depiction of the frame 22 is taken from below the frame 22 looking upward. The frame 22 is made of heavy gauge steel, but can alternatively be made of other materials depending upon the overall design of the vehicle 10. It should therefore be understood that the front side member 30 extends along and under a driver's side of the vehicle 10, and the second side member 32 extends along and under a passenger's side of the vehicle 10.

The front side member 30 is an elongated beam (a first side member) that has multiple contours and shapes. Specifically, the front side member 30 has a front end 30a and a rear end 30b. The front side member 30 also has a first portion 30c, a second portion 30d and a third portion 30e. The first portion 30c extends in the rearward direction $R_D$ from the front end 30a to a location proximate the second cross-member 36. The first portion 30c is generally straight. The second portion 30d has a curved shape such that just rearward of the first portion 30c, the second portion 30d gradually curves in the outboard direction $O_D$. The third portion 30e is generally straight, but can include contours and curves, depending upon the overall design of the vehicle 10.

Similarly, the second side member 32 is an elongated beam (a second side member) that has multiple contours and shapes that are symmetrical to the front side member 30. Specifically, the second side member 32 has a front end 32a and a rear end 32b. The second side member 32 also has a first portion 32c, a second portion 32d and a third portion 32e. The first portion 32c extends in the rearward direction $R_D$ from the front end 32a to a location proximate the second cross-member 36. The first portion 32c is generally straight. The second portion 32d has a curved shape such that just rearward of the first portion 32c, the second portion 32d gradually curves in the outboard direction $O_D$.

The first portions 30c and 32c of the first and second side members 30 and 32 are a first distance away from one another, and the third portions 30e and 32e are a second distance away from one another, with the second distance being greater than the first distance.

The first and second side members 30 and 32 each include body attachment structures 42 and 44 (also referred to as attachment flanges). The body attachment structures 42 and 44 are welded to the first and second side members 30 and 32 and are dimensioned and shaped to attach to the body structure 14 of the vehicle 10. The body attachment structures 42 extend from outboard sides of the first portions 30c and 32c of the first and second side members 30 and 32 forward of the first cross-member 34. The body attachment structures 44 extend from outboard sides of the second portions 30d and 32d of the first and second side members 30 and 32 rearward of the second cross-member 36.

Although not shown in FIG. 8, the third portions 30e and 32e of the first and second side members 30 and 32 can also include additional body attachment structures configured for attachment to structures that define the cargo area 20 of the vehicle 10. Further, the third portions 30e and 32e can be at the same level above the ground as the first portions 30c and 32c, or can be raised above the ground at a level higher that the first portions 30c and 32c, with the second portions 30d and 32d including an upward curvature.

As shown in FIG. 8, each of the first portions 30c and 32c of the first and second side members 30 and 32 further include front suspension structures such as coil spring supports 46, first suspension structures 48 and second suspension structures 50.

The coil spring supports 46 are rigidly fixed (i.e. welded) to respective ones of the first and second side members 30 and 32. The coil spring supports 46 are dimensioned and shaped to support lower ends of front suspension coil springs in a conventional manner. Since front suspension coil springs are conventional structures, further description is omitted for the sake of brevity.

The first suspension structures 48 are defined by pairs of flanges welded to lower surfaces of the first and second side members 30 and 32. Similarly, the second suspension structures 50 are defined by pairs of flanges welded to lower surfaces of the first and second side members 30 and 32 rearward and spaced apart from the first suspension structures 48. The first suspension structures 48 are adjacent to or aligned with the first cross-member 34. The second suspension structures 50 are adjacent to or aligned with the second cross-member 36.

The first suspension structures 48 and the second suspension structures 50 are configured to support a lower control arm (not shown) for pivotal movement about pivot bolts 54. The lower control arm is part of the steering and suspension structure of the vehicle 10. Since steering and suspension structures (and, in particular, control arm structures) are conventional vehicle components, further description is omitted for the sake of brevity.

The engine compartment 16 of the body structure 14 is approximately located in the space above and between the first portions 30*c* and 32*c* of the first and second side members 30 and 32. A front portion of the passenger compartment 18 is located in the space above and between the second portions 30*d* and 32*d* of the first and second side member rearward of the engine compartment 16. The remainder of the passenger compartment 18 and the cargo area 20 of the body structure 14 are located above the third portions 30*e* and 32*e* of the first and second side members 30 and 32.

As shown in FIGS. 8 and 9, the first cross-member 34 is rigidly attached to the front side member 30 and rigidly attached to the second side member 32. The first cross-member 34 can be co-planar with the first and second side members 30 and 32, or can be located above or below the first and second side members 30 and 32. The first cross-member 34 has a first end 34*a*, a second end 34*b* and mid-section 34*c* that extends from the first end 34*a* to the second end 34*b*. The first end 34*a* of the first cross-member is fixed to the front side member 30.

In the depicted embodiment, the first cross-member 34 extends in a vehicle lateral direction from the first portion 30*c* of the front side member 30 to the first portion 32*c* of the second side member 30 at a location rearward of the front ends 30*a* and 32*a*. The first cross-member 34 is further rigidly fixed to each of the front side member 30 and the second side member 32. As shown in FIGS. 8 and 9, the first cross-member 34 extends perpendicular to the first portion 30*c* of the front side member 30 and the first portion 32*c* of the second side member 32.

The second end 34*b* of the first cross-member 34 is also fixed to the second side member 32 in a manner consistent with the attachment of the first end 34*a* to the front side member 30. Since the attachment of the second end 34*b* to the second side member 32 is basically the same as the attachment of the first end 34*a* to the front side member 30, further description of the attachment of the first cross-member 34 to the second side member 32 is omitted for the sake of brevity.

The second cross-member 36 extends in the vehicle lateral direction and is rigidly fixed to areas of each of the front side member 30 and the second side member 32 rearward of the first cross-member 34. The second cross-member 36 can be welded to each of the first portions 30*c* and 32*c* of the first and second side members 30 and 32. However, the second cross-member 36 can be attached to the first and second side members 30 and 32 via mechanical fasteners (not shown).

An engine receiving space is defined in the area confined between the first and second cross-members 30 and 32, and between the first and second side members 34 and 36. An engine or power plant P is installed to the frame 22 in the engine receiving space in a conventional manner. The power plant P (also referred to as a vehicle power plant) can be an electric motor, an electric motor combined with an internal combustion engine (hybrid motor), a gasoline powered internal combustion engine or a diesel powered internal combustion engine. The power plant P has a significant amount of mass (weight) to the overall weight of a vehicle. For example, a power plant for a vehicle can typically constitutes anywhere from 15% to 45% of the overall weight of a vehicle. In the depicted embodiment, the power plant P constitutes approximately 30% of the overall weight of the vehicle 10, with the vehicle 10 in a cargo free and passenger free state.

The third cross-member 38 extends between front ends of each of the third portions 30*e* and 32*e* of the first and second side members 30 and 32. The third cross-member 38 is welded to each of the first and second side members 30 and 32 and can serve as an attachment structure for a rear portion of the body structure 14 (at a mid-portion of the passenger compartment 18), and/or can serve as an attachment structure for the structure that defines the cargo area 20.

The front cross-member 40 is welded or otherwise rigidly fixed to the front ends 30*a* and 32*a* of the first and second side members 30 and 32. A bumper structure (not shown) can be attached to the front cross-member 40. Alternatively, the bumper structure (not shown) can be attached to the front ends 30*a* and 32*a* of the first and second side members 30 and 32 replacing the front cross-member 40.

The front cross member 40 is attached to the front side member 30 at or adjacent to the front end 30*a* of the front side member 30. The front cross member 40 can optionally include an outboard portion 40*a* that extends from the front side member 30 forward of the off-center impact structure 12 in the outboard direction $O_D$. In response to an impact event of an off-center impact test, the outboard portion 40*a* of the front cross member 40 deforms and can contact a portion of the off-center impact structure 12, as described in greater detail below. However, it should be understood from the drawings and the description herein that the outboard portion 40*a* is optional and is not required.

A description of the off-center impact structure 12 is now provided with specific reference to FIGS. 9-12. As is shown in FIG. 8, one of the off-center impact structures 12 is installed to the front side member 30 and another one of the off-center impact structures 12 is installed to the front side member 32. The two off-center impact structures 12 are symmetrically arranged relative to the longitudinal center line $C_L$ of the vehicle 10. The two off-center impact structures 12 are structurally, basically identical, except that they are mirror images of one another. Consequently, description of one of the off-center impact structures 12 applies equally to the other. Therefore, only one of the off-center impact structures 12 is described herein below for the sake of brevity.

Each of the elements and structures that define the off-center impact structure 12 is connected to, supported to and/or directly attached to the front side member 30, as shown in FIGS. 9-11 and 13-14.

Figures 11, 12:
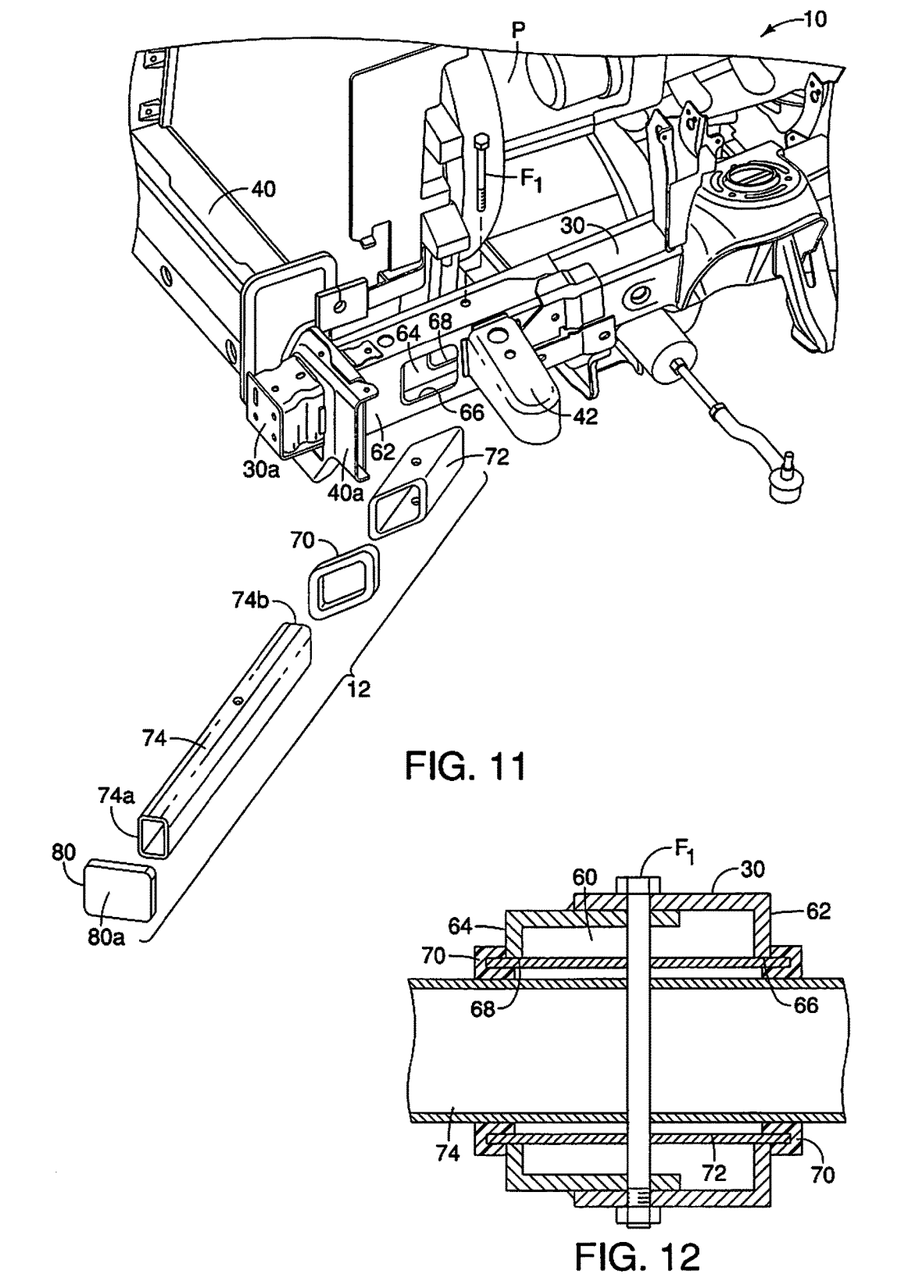
FIG. 11 is an exploded perspective view of the driver's front side of the frame and the off-center impact structure, showing details of the off-center impact structure in accordance with the first embodiment.
FIG. 12 is a cross-sectional view of the frame and a portion of the off-center impact structure taken along the line 12-12 in FIG. 10, showing details of the portion of the off-center impact structure in accordance with the first embodiment.
Figure 13:
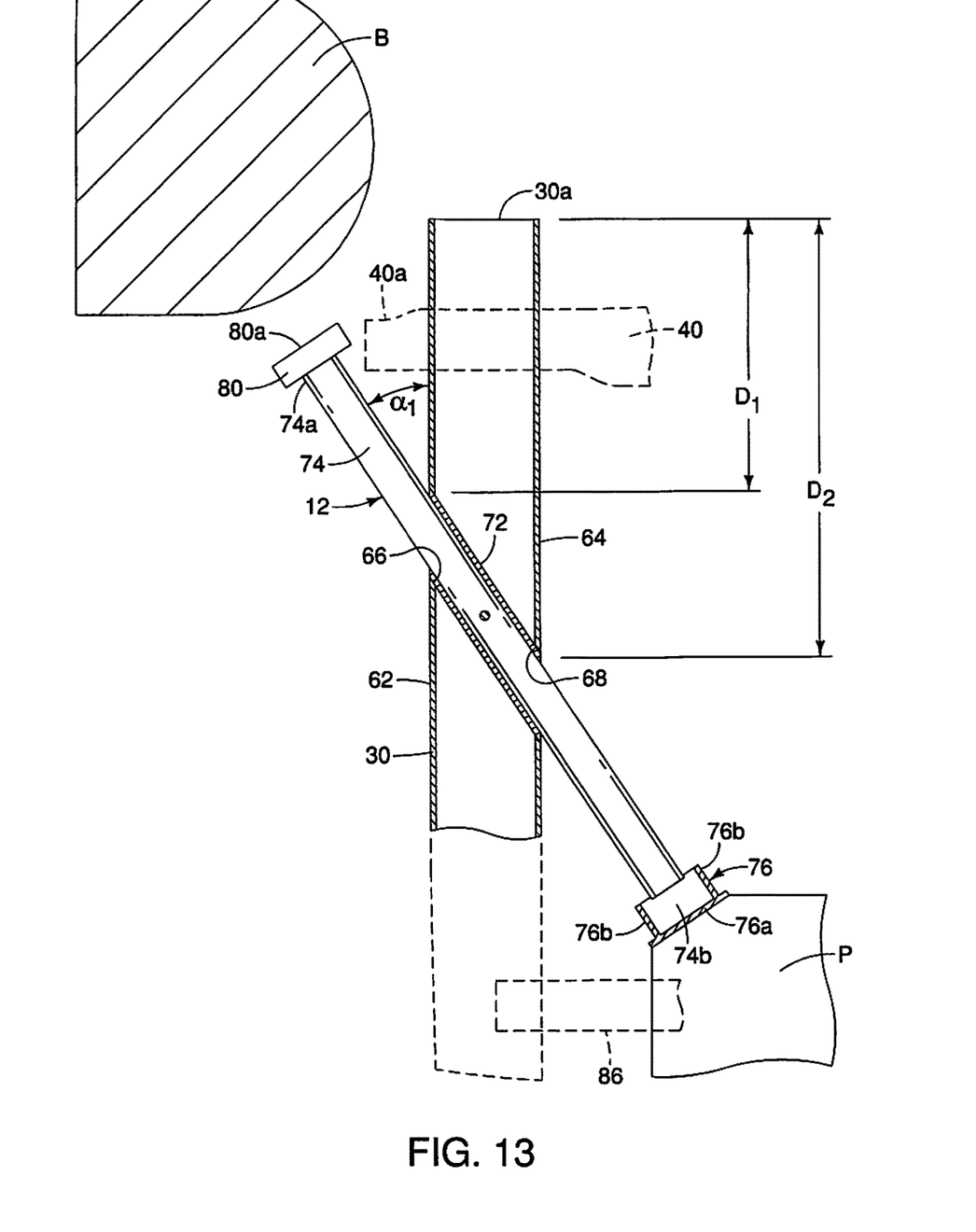
FIG. 13 is a schematic cross-sectional view of the frame and the off-center impact structure showing details of a sleeve and an elongated member of the off-center impact structure in a non-impacted orientation in accordance with the first embodiment.
Figure 14:
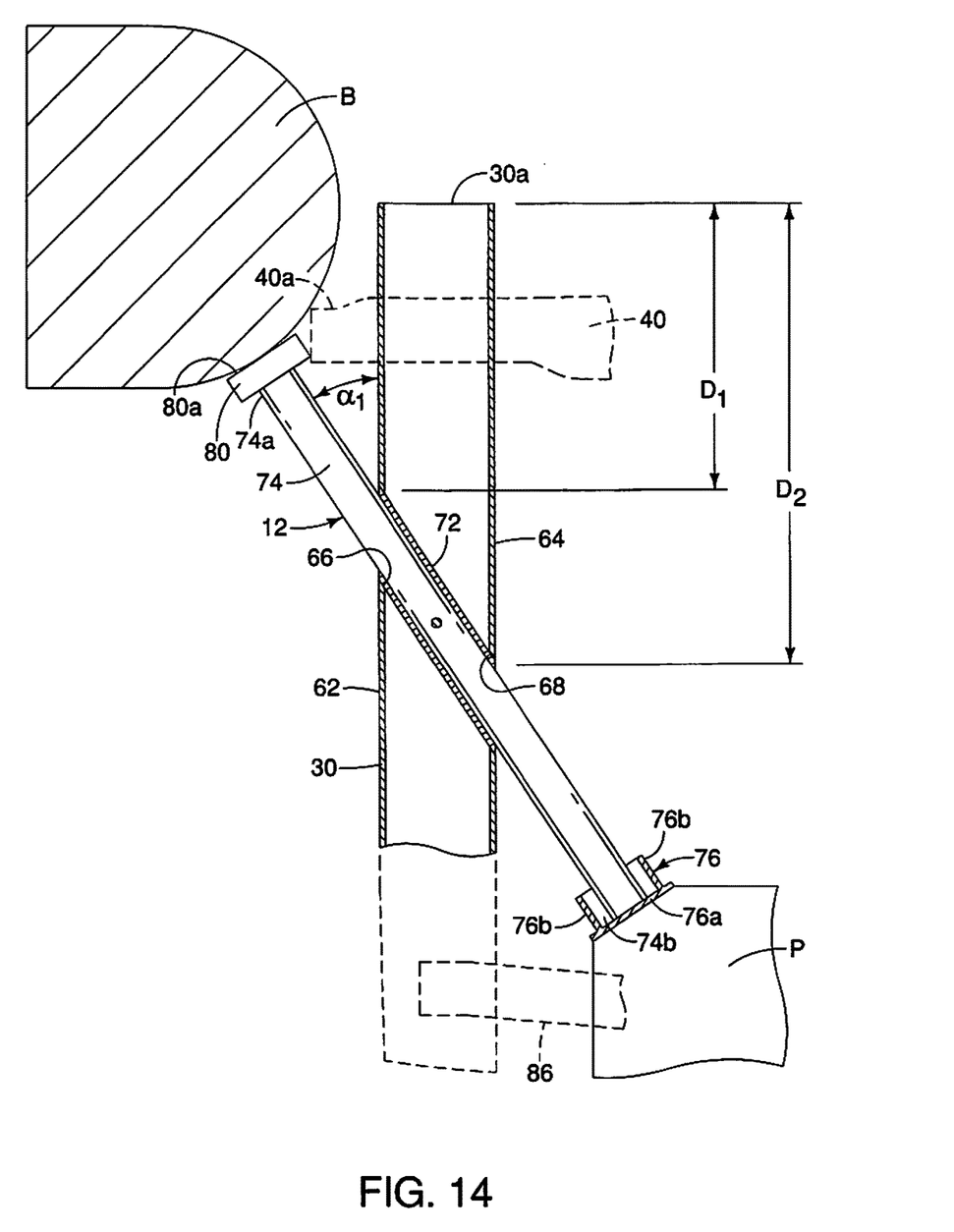
FIG. 14 is another schematic cross-sectional view of the frame and the off-center impact structure showing details of the sleeve and the elongated member of the off-center impact structure in an impacted orientation in accordance with the first embodiment.

In the depicted embodiment as shown in FIG. 11, the front side member 30 defines a hollow interior 60. The first portion 30*c* (also referred to as the front-section) of the front side member 30 extends in a rearward direction from the front end 30*a* of the front side member 30 in a vehicle longitudinal direction parallel to the longitudinal center line $C_L$. As shown in FIGS. 12-14, the front side member 30 has an outboard wall 62 and an inboard wall 64.

The outboard wall 62 defines an outboard opening 66 that extends through the outboard wall 62 and to the hollow interior 60. The inboard wall 64 of the front side member 30 defines an inboard opening 68 that extends through the inboard wall 64 and to the hollow interior 60. As shown in FIGS. 8-9 and 13-14, the outboard opening 66 is located forward of the body attachment structure 42 and at least a portion of the inboard opening 68 is located rearward of the body attachment structure 42. Further, the inboard opening 68 is located rearward of the outboard opening 66. As shown in FIG. 13, a front edge of the outboard opening 66 being located a first distance $D_1$ from the front end 30a of the front side member 30. A front edge of the inboard opening 68 is located a second distance $D_2$ from the front end 30a of the front side member. The second distance $D_2$ is greater than the first distance $D_1$.

The body attachment structure 42 is attached to the outboard wall 62 of the front side member 30 along the front portion 32 (the front-section) rearward of the first outboard opening 66 via, for example, welding techniques.

As shown in FIGS. 9-14 the off-center impact structure 12 basically includes collars 70, a sleeve 72, an elongated member 74 and a guiding structure 76. The collars 70 are made of an elastic or resilient plastic material and snuggly fit around an outer periphery of the elongated member 74. The sleeve 72 is a hollow beam member with open ends that expose a hollow interior of the sleeve 72. The sleeve 72 is inserted into the outboard opening 66 through the hollow interior 60 and to the inboard opening 68 of the front side member 30. The sleeve 72 basically defines a tunnel through the front side member 30. The sleeve 72, like the front side member 30, is preferably made of a metallic material such as steel and is fixedly attached to the outboard wall 62 and the inboard wall 64. For example, the sleeve 72 can be welded to the outboard wall 62 and welded to the inboard wall 64, but can alternatively be attached to the front side member 30 via mechanical fasteners. As shown in FIG. 12, the collars 70 are fitted to opposite ends of the sleeve 72. The collars 70 can be held in place by friction or an adhesive material (not shown).

The elongated member 74 is inserted through the collars 70 and the sleeve 72. The collars 70 are shaped and configured to prevent contact between the sleeve 72 and the elongated member 74. Hence, the collars 70 prevent noise that would otherwise be generated by contact between the sleeve 72 and the elongated member 74. As shown in FIG. 12, a fastener $F_1$ is inserted through apertures in the front side member 30, the sleeve 72 and the elongated member 74. The fastener $F_1$ retains the elongated member 74 in place within the sleeve 72 and the front side member 30. As shown in FIG. 13, the elongated member 74 has an inboard surface adjacent to an outboard surface of the outboard wall 62 of the front side member 30 such that in a non-impacted state the inboard surface of the elongated member 74 and the outboard surface of the outboard wall 62 define an acute angle $\alpha_1$ that is between 25 and 45 degrees. The acute angle $\alpha_1$ can also be between 30 and 40 degrees. In the depicted embodiment, the acute angle $\alpha_1$ is 35 degrees.

In a non-impacted state (FIGS. 9, 10 and 13), the elongated member 74 is a linearly extending hollow beam member that includes a front end 74a and a rear end 74b. The elongated member 74 is inserted into the sleeve 72 such that the front end 74a is exposed outboard relative to the front side member 30 and the rear end 74b is exposed inboard relative to the front side member 30.

The front end 74a includes an end plate 80 fixed thereto via, for example, welding techniques. The end plate 80 defines a forward surface or impact receiving surface 80a positioned and configured to contact a fixed barrier and receive impacting forces from an impact event during the off-center impact test. More specifically, the impact receiving surface 80a is located outboard of the front end 30a of the front side member 30. The end plate 80 extends perpendicular to an overall lengthwise direction of the elongated member 74.

The attachment between the elongated member 74 and the sleeve 72 via the fastener $F_1$ can be calibrated or attenuated such that the elongated member 74 is released from the sleeve 72 in response to a predetermined impact energy level. In other words, during an impact event of an off-center overlap impact test, the fastener $F_1$ fixing the elongated member 74 in place to the sleeve 72 can configured to release the elongated member 74 from the sleeve 72 upon application of force above a predetermined force level. Conversely, during an impact event of an off-center overlap impact test, the fastener $F_1$ holding or fixing the elongated member 74 in place to the sleeve 72 can configured to retain the elongated member 74 to the sleeve 72 upon application of force lower than the predetermined force level.

As shown in FIGS. 13 and 14, the guiding structure 76 is directly attached to the power plant P. The power plant P is supported to the front side member 30 via, for example, a motor mount 86 at a point rearward of and adjacent to the inboard opening 68. The guiding structure 76 includes an end plate 76a and guide walls 76b.

Figure 15:
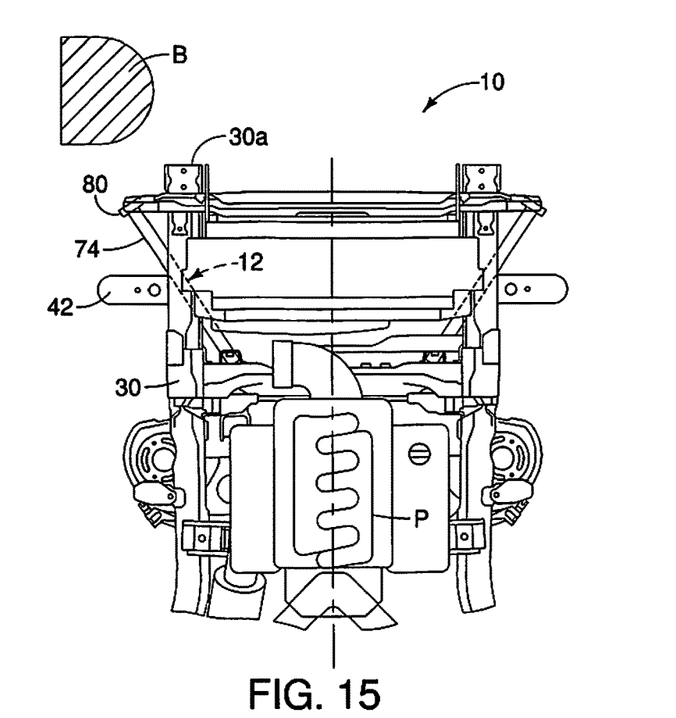
FIG. 15 is a schematic view of the vehicle and the off-center impact structure being subjected to a small overlap test where approximately 25 percent of the front of the vehicle aligned with the fixed, rigid barrier for eventual impact with the barrier in accordance with the first embodiment.

FIGS. 13 and 15 show the off-center impact structure 12 in a non-impacted state. In the non-impacted state in FIG. 13, the front end 74a of the elongated member 74 is located adjacent to and outboard of the front end 30a of the front side member 30. In the non-impacted state, the rear end 74b of the elongated member 74 is located adjacent to the vehicle power plant P and between the guide walls 76b of the guiding structure 76. Further, in the non-impacted state, the rear end 74b of the elongated member 74 is spaced apart from the vehicle power plant P, the guide walls 76b of the guiding structure 76 and the end plate 76a of the guiding structure 76. Since the vehicle power plant P is likely to vibrate during operation thereof, the spaced apart relationship between the elongated member 74 and the guiding structure 76 prevents vibrations from the vehicle power plant P from being transmitted to the frame 22.

FIG. 14 shows the off-center impact structure 12 in an impacted state after initial contact between the barrier B and the end plate 80 of the elongated member 74. In response to the impact event of the off-center impact test, the elongated member 74 can break free from direct attachment to the sleeve 72 and move rearward. Consequently, the rear end 74b of the elongated member 74 moves into contact with the end plate 76a of the guiding structure 76 transmitting impacting force to the guiding structure 76 and the vehicle power plant. In the event that front side member 30, other portions of the frame 22 and/or the elongated member 74 are further deformed, the guide walls 76b limit lateral movement of the rear end 74b of the elongated member 74 relative to the vehicle power plant P, ensuring continuing transmittal of impact energy to the vehicle power plant P during the entire impact event.

Figure 16:
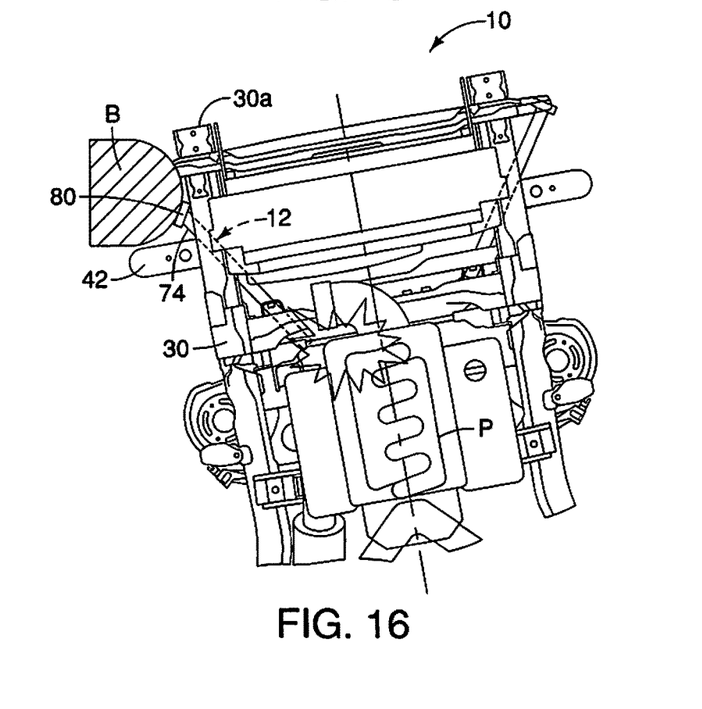
FIG. 16 is another schematic view of the vehicle depicted in FIG. 15 showing a response to the impact event of the small overlap test with the off-center impact structure impacting the barrier and transmitting impact force to a power plant (engine) of the vehicle in accordance with the first embodiment.

As shown FIG. 15, just prior to an impact event, the vehicle 10 moves in the forward direction unhindered. As shown in FIG. 16 near the completion of the impact event of the small overlap test, the vehicle 10 moves laterally away from the barrier B. During the small overlap test, a significant portion of the impacting forces received by the off-center impact structure 12 are transmitted through the elongated member 74, through the guiding structure 76, and to the power plant P causing lateral movement of the vehicle 10. This reaction to the impact event is a result of a significant amount of impacting force being applied directly to the power plant P, which includes a significant portion of the overall mass (weight) of the vehicle 10.

The guiding walls 76b of the guiding structure 76 can be a pair of walls extending from the end plate 76a along opposite sides of the elongated member 74. Alternatively, the guiding walls 76b can be part of a tube-like structure that completely encircles the rear end 74b of the elongated member 74.

The vehicle body structure 14 and elements of the frame 22 (other than the off-center impact structure 12) are conventional components that are well known in the art. Since these elements and structures are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also, as used herein to describe the above embodiments, the following directional terms "forward", "rearward", "above", "downward", "vertical", "horizontal", "below" and "transverse" as well as any other similar directional terms refer to those directions of a vehicle equipped with the vehicle body structure. Accordingly, these terms, as utilized to describe the present invention should be interpreted relative to a vehicle equipped with the vehicle body structure.

The term "configured" as used herein to describe a component, section or part of a device includes mechanical structures that are constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle body structure comprising:
    a vehicle structure having a front side member with a front end and a front-section extending rearward from the front end, the front side member defining a hollow interior and extending in a vehicle longitudinal direction, the front side member having an outboard wall with an outboard opening extending through the outboard wall and to the hollow interior and an inboard wall with an inboard opening extending through the inboard wall and to the hollow interior, the outboard opening being located a first distance from the front end of the front side member and the inboard opening being located a second distance from the front end of the front side member, the second distance being greater than the first distance;
    a vehicle power plant supported to the vehicle structure inboard of the front side member adjacent to the inboard opening; and
    an off-center impact structure having an elongated member that extends through the outboard opening, through the hollow interior and through the inboard opening of the front side member, the elongated member being fixedly coupled to the outboard wall and the inboard wall such that a front end of the elongated member is located adjacent and outboard of the front end of the front side member and a rear end of the elongated member is located adjacent to the vehicle power plant such that in response to an impact event of an off-center impact test the rear end of the elongated member contacts the vehicle power plant transmitting impacting force thereto.

2. The vehicle body structure according to claim 1, wherein
    in a non-impacted state the elongated member is a linearly extending hollow beam with an end plate attached to a front end thereof, the end plate defining an impact receiving surface configured to contact a fixed barrier during the off-center impact test.

3. The vehicle body structure according to claim 2, wherein
    the elongated member has an inboard surface and the outboard wall of the front side member has an outboard surface such that in a non-impacted state the inboard surface and the outboard surface define an acute angle that is between 25 and 45 degrees.

4. The vehicle body structure according to claim 3, wherein
    the acute angle is between 30 and 40 degrees.

5. The vehicle body structure according to claim 3, wherein
    the acute angle is 35 degrees.

6. The vehicle body structure according to claim 5, wherein the off-center impact structure further includes a sleeve that extends through the outboard opening, the hollow interior and through the inboard opening of the front side member, the first sleeve being fixedly attached to the outboard wall and the inboard wall with a portion of the elongated member extending completely through the sleeve, the elongated member being directly attached to the sleeve.

7. The vehicle body structure according to claim 6, wherein
the sleeve is welded to the outboard wall and welded to the inboard wall.

8. The vehicle body structure according to claim 7, wherein
the elongated member is directly attached to the sleeve via removable fasteners.

9. The vehicle body structure according to claim 7, wherein
the elongated member is directly attached to the sleeve via welds.

10. The vehicle body structure according to claim 7, wherein
the elongated member is attached to the sleeve such that in response to a predetermined amount of force being applied to the elongated member during the impact event of the off-center impact test the elongated member breaks free from the sleeve and is movable within the sleeve.

11. The vehicle body structure according to claim 1, wherein
the front end of the elongated member includes an end plate that extends perpendicular to an overall lengthwise direction of the elongated member, the end plate defining an impact surface configured to receive impact force during the off-center impact test.

12. The vehicle body structure according to claim 11, further comprising
a front cross member attached to the front end of the front side member having an outboard portion that extends from the front side member in a laterally outboard direction structure toward the impact surface of the end plate of the elongated member.

13. The vehicle body structure according to claim 12, wherein
the front cross member extends in a vehicle lateral direction perpendicular to the front side member.

14. The vehicle body structure according to claim 1, further comprising
a front cross member attached to the front end of the front side member having an outboard portion that extends from the front side member in a laterally outboard direction structure toward the front end of the elongated member.

15. The vehicle body structure according to claim 14, wherein
the front cross member extends in a vehicle lateral direction perpendicular to the front side member.

16. The vehicle body structure according to claim 1, wherein
the off-center impact structure further includes a guiding structure fixed to the power plant, the guiding structure being spaced apart from the elongated member in a non-impacted state and in response to the impact event of the off-center impact test the rear end of the elongated member contacts the guiding structure transmitting impacting force to the vehicle power plant via the guiding structure.

17. The vehicle body structure according to claim 16, wherein
the guiding structure includes an end plate and guide walls fixed to the end plate, the end plate being fixedly attached to the vehicle power plant and the guide walls extending along opposite sides of the rear end of the elongated member but spaced apart therefrom in the non-impacted state.

\* \* \* \* \*